(12) United States Patent
Campagnolo (10) Patent No.: US 7,886,947 B2
(45) Date of Patent: *Feb. 15, 2011

(54) ELECTRONIC CONTROL CONTAINMENT UNIT FOR BICYCLES

(75) Inventor: Valentino Campagnolo, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 355 days.

This patent is subject to a terminal disclaimer.

(21) Appl. No.: 10/975,236

(22) Filed: Oct. 28, 2004

(65) Prior Publication Data

US 2005/0056670 A1   Mar. 17, 2005

Related U.S. Application Data

(63) Continuation of application No. 09/850,069, filed on May 8, 2001, now Pat. No. 6,923,355.

(51) Int. Cl.
B62J 11/00 (2006.01)

(52) U.S. Cl. .................. 224/414; 224/425; 224/440; 224/929; 224/902

(58) Field of Classification Search ................ 224/412, 224/414, 419, 425, 428, 431, 440, 456, 461, 224/462, 902, 926, 929, 429; 248/311.2
See application file for complete search history.

(56) References Cited

U.S. PATENT DOCUMENTS

| | | | |
|---|---|---|---|
| 675,390 A | 6/1901 | Keating | |
| 1,439,430 A | 12/1922 | Lyhne | |
| 3,995,491 A | 12/1976 | Wolfla, II | |
| 4,019,171 A * | 4/1977 | Martelet | 340/432 |
| 4,204,191 A * | 5/1980 | Daniels | 340/432 |
| 4,443,008 A | 4/1984 | Shimano et al. | |
| 4,780,864 A | 10/1988 | Houlihan | |
| 4,814,951 A * | 3/1989 | Larsen | 362/473 |
| 4,833,777 A * | 5/1989 | Clark | 29/854 |
| 4,948,080 A | 8/1990 | Jack | |
| 5,170,981 A | 12/1992 | Lin | |
| 5,177,432 A | 1/1993 | Waterhouse et al. | |
| 5,199,619 A | 4/1993 | Mostashari | |
| 5,217,116 A | 6/1993 | Ku | |
| 5,245,517 A * | 9/1993 | Fenton | 362/156 |
| 5,276,593 A | 1/1994 | Lighthill et al. | |
| 5,356,058 A * | 10/1994 | Fenton | 224/427 |
| 5,392,971 A * | 2/1995 | Hsu | 224/414 |
| 5,423,509 A | 6/1995 | LaPorte | |
| 5,426,570 A | 6/1995 | Davis et al. | |
| 5,561,414 A * | 10/1996 | Chin | 340/432 |
| 5,570,752 A | 11/1996 | Takata | |
| 5,597,225 A | 1/1997 | Davis | |
| 5,624,064 A * | 4/1997 | McGee, Jr. | 224/414 |
| 5,651,485 A | 7/1997 | Impastato, II et al. | |
| 5,803,328 A | 9/1998 | Nakahara | |

(Continued)

FOREIGN PATENT DOCUMENTS

JP   020 021931 64   7/2002

*Primary Examiner*—Justin M Larson
(74) *Attorney, Agent, or Firm*—Volpe and Koenig, PC (57) ABSTRACT

A bottle-cage supporting unit for a bicycle includes a cage support for the bottle, associated to which are a container for an electronic control unit for a motor-driven gear-shifting system with which the bicycle is equipped and a container for the electric power-supply battery for the electronic control unit.

22 Claims, 6 Drawing Sheets

U.S. PATENT DOCUMENTS

| | | | |
|---|---|---|---|
| 5,839,709 A | 11/1998 | Leonard | |
| 6,060,982 A * | 5/2000 | Holtrop | 340/432 |
| 6,095,270 A | 8/2000 | Ishikawa | |
| 6,158,881 A * | 12/2000 | Carne | 362/473 |
| 6,196,474 B1 * | 3/2001 | Hillerson | 239/289 |
| 6,216,929 B1 * | 4/2001 | Bonard et al. | 224/414 |
| 6,286,982 B1 * | 9/2001 | Tashiro | 362/474 |
| 6,357,616 B1 | 3/2002 | Harris et al. | |
| 6,423,443 B1 | 7/2002 | Tsuboi et al. | |
| 6,597,166 B2 * | 7/2003 | Meggiolan | 324/174 |
| 6,616,021 B1 * | 9/2003 | Shih | 224/414 |
| 6,669,220 B2 * | 12/2003 | Meggiolan | 280/288.4 |
| 6,896,277 B2 * | 5/2005 | Meggiolan | 280/288.4 |
| 6,923,355 B2 * | 8/2005 | Campagnolo | 224/414 |
| 2001/0042767 A1 | 11/2001 | Campagnolo | |
| 2002/0052258 A1 | 5/2002 | Meggiolan | |

* cited by examiner

Fig_3

Fig_6

Fig_7

Fig_10

Fig_11

ELECTRONIC CONTROL CONTAINMENT UNIT FOR BICYCLES

This application is a continuation of U.S. patent application Ser. No. 09/850,069 filed May 8, 2001, which is incorporated by reference as if fully set forth.

FIELD OF INVENTION

The present invention relates to bicycles of the type comprising a frame, a bottle-cage supporting unit fixed to the frame, at least one electronic control device on board the bicycle, and an electronic control and/or power-supply system for said electronic device.

BACKGROUND

The use of an electronic control and/or power-supply system on board a bicycle has already been proposed in the past, with particular reference to bicycles provided with electronically controlled motor-driven gear change. An example of solutions of this sort is described and illustrated in the U.S. Pat. No. 5,470,277 filed by the present applicant. For bicycles of the above type there exists the need to have available a housing for the electronic control unit that does not hinder normal use of the bicycle and at the same time enables access for possible replacement or for maintenance operations in an easy and fast way.

SUMMARY

With a view to solving the above problem in an efficient way, the subject of the present invention is a containment unit for an electronic control and/or power-supply system in a bicycle of the type specified previously, characterized in that the aforesaid containment unit for the electronic control and/or power-supply system has a conformation designed for being fixed to the bicycle frame in the same point where the bottle-cage supporting unit is fixed.

In a preferred embodiment, the aforesaid containment unit comprises a container for at least one electronic control card and an auxiliary container for an electric power-supply battery. In a preferred embodiment, the aforesaid containment unit can be fixed to the frame of the bicycle using the same fixing means as those that secure the bottle-cage supporting unit to the bicycle.

The invention envisages various embodiments of the general idea of solution described above. For example, in a first embodiment, the bottle-cage support includes a supporting plate which can be fixed to a tube of the bicycle frame, typically the down tube, and moreover includes auxiliary supporting means designed to be set between said supporting plate and the tube of the bicycle frame. In the latter case, the container for the electronic control unit is rigidly connected to the bottom end of said auxiliary means and projects in cantilever fashion therefrom beneath the space designed to receive the bottle.

Preferably, in the aforesaid embodiment, the auxiliary supporting means are provided laterally with elastic clips or clamps for anchoring an elongated sheath constituting the container for the electric power-supply battery. The same auxiliary plate can also be provided, on its side opposite to the one equipped with the aforesaid elastic clamps, with further clamps for anchorage of a pump for inflating the tyres of the bicycle.

In a variant embodiment, the container for the electronic control unit has a flattened body designed to be set between the bottle-cage support and the tube of the frame of the bicycle. Preferably, the said flattened body has, on one of its sides, a sheath designed to receive the electric power-supply battery.

In a further variant embodiment, the container for the electronic control unit is set in a projecting position at the base of the bottle, as in the case of the first embodiment described previously, and moreover includes, beneath the aforesaid container, a further container for the electric power-supply battery.

Of course, a wide range of modifications are in any case possible to the examples of embodiment described above, without prejudice to the principle of arranging the container for the electronic control unit in association with the bottle-cage supporting unit, preferably using the same fixing screws that are used for fixing the bottle-cage supporting unit to the frame of the bicycle also for anchoring the container carrying the electronic control unit.

BRIEF DESCRIPTION OF THE DRAWING(S)

Further characteristics and advantages of the present invention will emerge from the ensuing description, with reference to the attached drawings, which are provided purely by way of non-limiting examples and in which.

DETAILED DESCRIPTION OF THE PREFERRED EMBODIMENT(S)

Figures 1, 4:
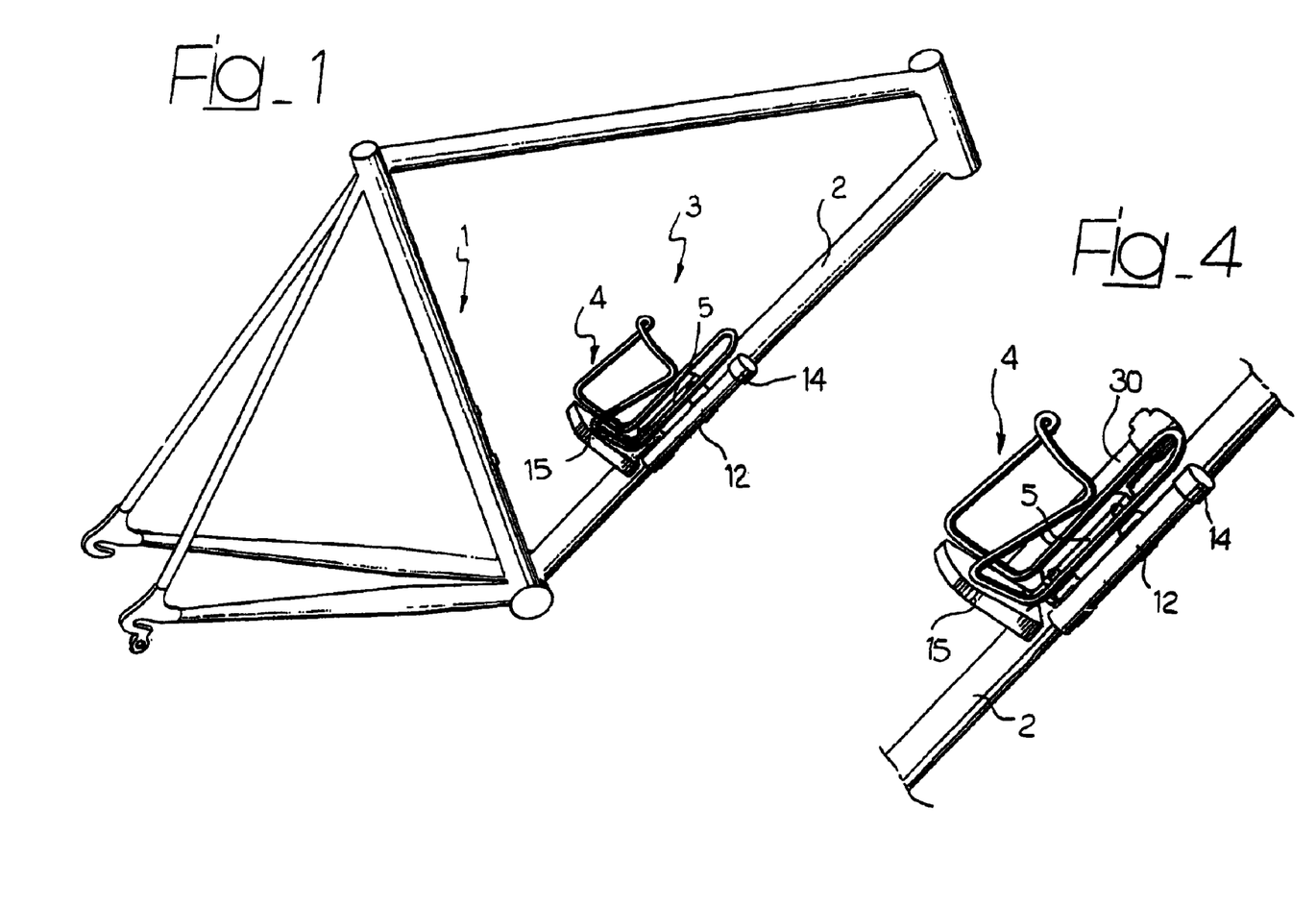
FIG. 1 is a perspective view of a first embodiment of the bottle-cage supporting unit according to the invention, in the condition where it is mounted on a bicycle frame.
FIG. 4 is a perspective view of a second embodiment of the bottle-cage supporting unit according to the invention.
Figure 2:
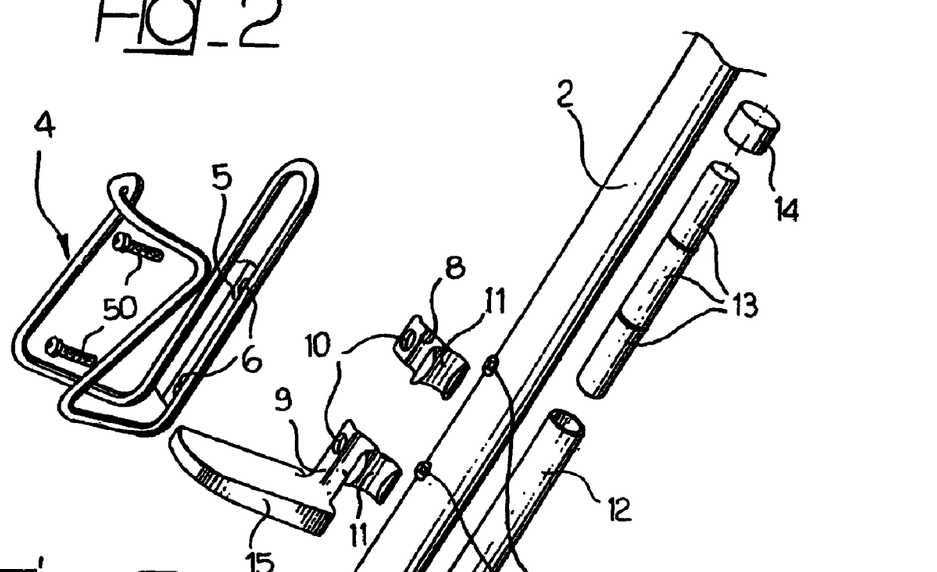
FIG. 2 is an exploded perspective view of the unit of FIG. 1.

With reference to FIGS. 1 and 2, the number 1 designates, as a whole, a bicycle frame of a type in itself known, including a down tube 2 to which a bottle-cage supporting unit 3 according to the present invention is fixed. In the example illustrated, the bottle-cage supporting unit 3 comprises a support 4 for the bottle (not illustrated) consisting of a bent metal wire rigidly connected to a supporting plate 5 provided with holes 6 for engagement of fixing screws 50 designed to engage corresponding holes 7 made in the down tube 2 or in any other tube of the bicycle frame. The bottle-cage supporting unit 4 moreover comprises a top auxiliary plate 8 and a bottom auxiliary plate 9 which are set between the plate 5 and the tube 2 of the frame and which have respective holes 10 for engagement of the same screws 50 that fix the plate 5 to the frame tube 2. In the example illustrated, both of the plates 8 and 9 are made of plastic material and incorporate, in a single piece, two respective clamps 11 for fixing a cylindrical sheath 12 which receives within it the electrical battery and which is provided with a closing lid 14. The bottom plate 9 is rigidly connected to a container 15 for an electronic control unit which is supplied by the battery 13 and which is associated to a motor-driven gear-shifting system with which the bicycle is equipped. The structure described above can be better seen in FIG. 3, where the container 15 is illustrated in the exploded condition, with the lid 16 made of a single piece of plastic material with the bottom plate 9. The upper lid 16 can be fixed by means of screws 17 to a tray-shaped body 18 made of plastic material which receives, inside its open volume, the electronic control unit 19. The latter includes a connector 20 for a cable 21 designed to be connected to a pedalling-cadence sensor, with which the bicycle is provided, a connector 22 for a cable 23 designed to be connected to the electric motor for controlling the front derailleur of the bicycle, a connector 24 for a cable 25 designed to be connected to an electric motor for controlling the rear derailleur of the bicycle, a connector 26 for a cable 27 designed to be connected to the display unit mounted on the handlebars of the bicycle, and a connector 28 for a cable 29 connected to the battery 13 which is received inside the sheath 12.

Thanks to the structure and arrangement described above, the bottle-cage supporting unit according to the invention is able to perform the supplementary function of supporting the electronic control unit 19 and the corresponding power-supply battery 13. The said components are thus mounted on the bicycle in a position in which they do not in the least hinder normal use of the bicycle and in which they are, at the same time, immediately and readily accessible for a possible replacement or for maintenance operations.

Figure 3:
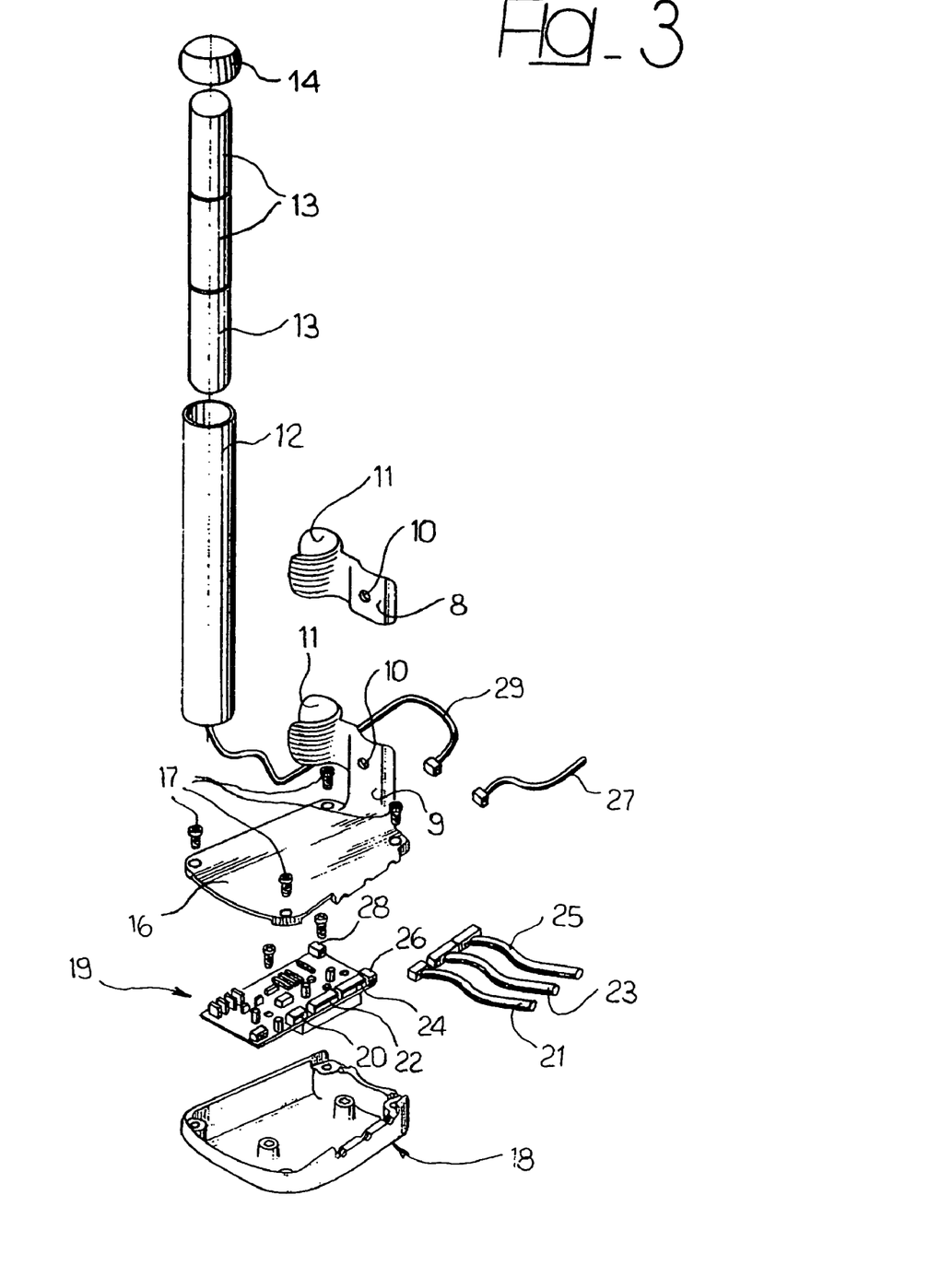
FIG. 3 is an exploded perspective view at an enlarged scale of the bottle-cage supporting unit of FIG. 1.
Figure 5:
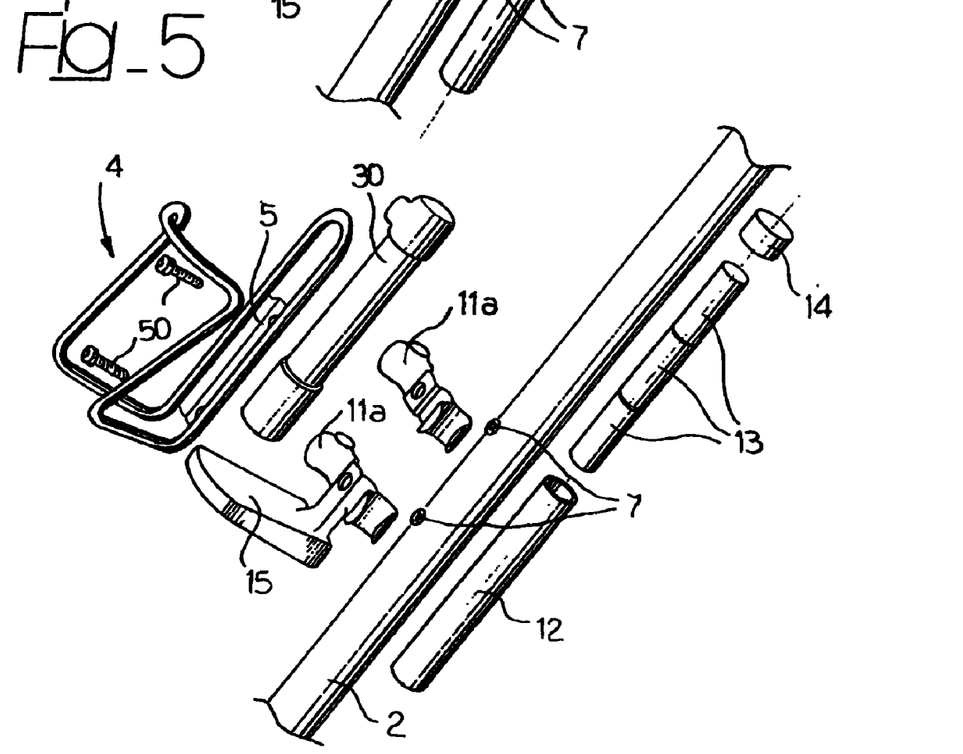
FIG. 5 is an exploded perspective view of the unit of FIG. 4.

FIGS. 4 and 5 illustrate a solution substantially identical to that of FIGS. 1-3, differing from the latter only in that the two auxiliary plates 8, 9 are provided on one side, with the two elastic clamps for supporting the container 12 of the electric power-supply batteries 13, and on the other side with two elastic clamps ila for supporting a manual pump 30, of any known type, usable for inflating the tyres of the bicycle.

Figure 6:
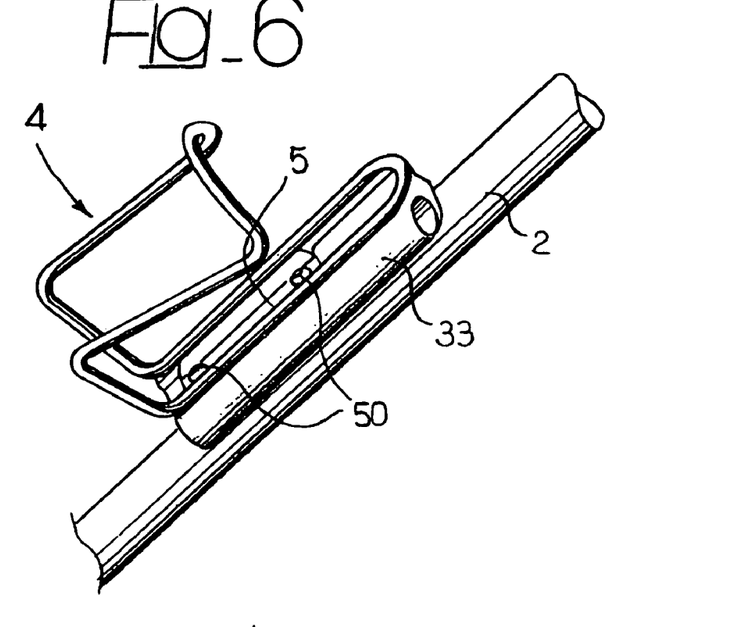
FIGS. 6 and 7 are, respectively, a perspective view and an exploded perspective view of a third embodiment of the invention.
Figure 7:
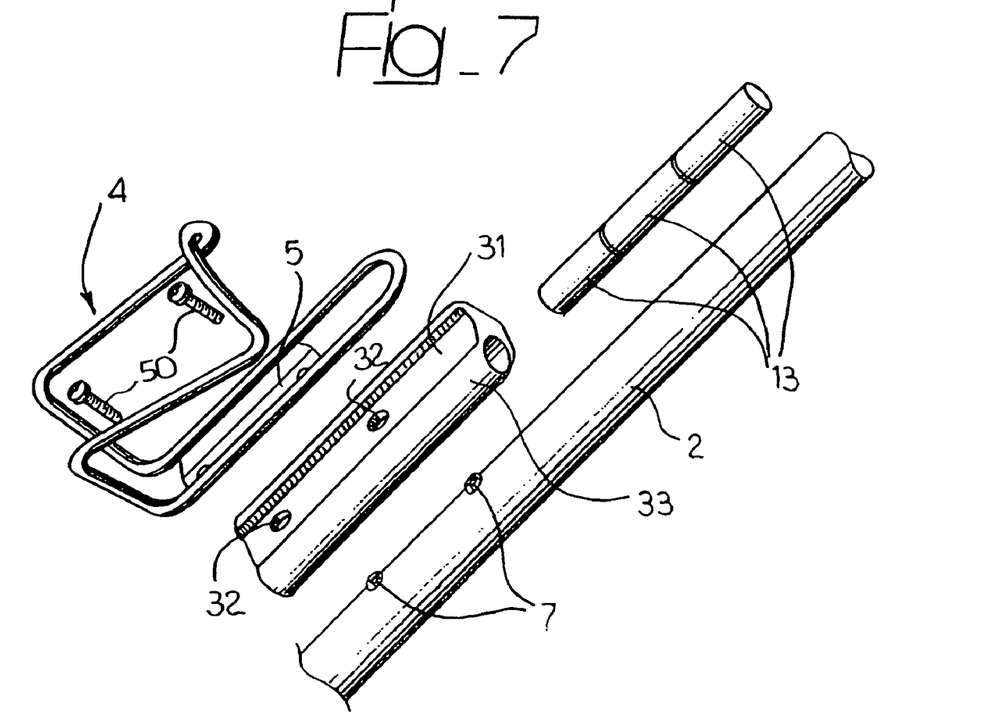

FIGS. 6 and 7 illustrate a variant in which the container for the electronic control unit consists of a flattened body 31 which is set between the plate 5 for carrying the bottle-cage supporting unit and the tube 2 of the frame and which includes two holes 32 for engagement of the fixing screws. The same container 31 incorporates, on one side, a sheath 33 for the batteries 13.

Figure 8:
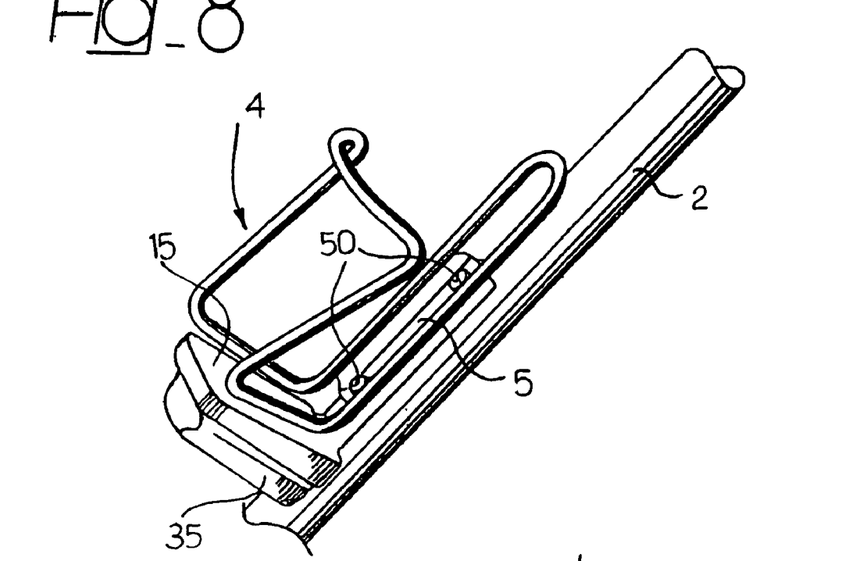
FIGS. 8 and 9 are, respectively, a perspective view and an exploded perspective view of a fourth embodiment.
Figure 9:
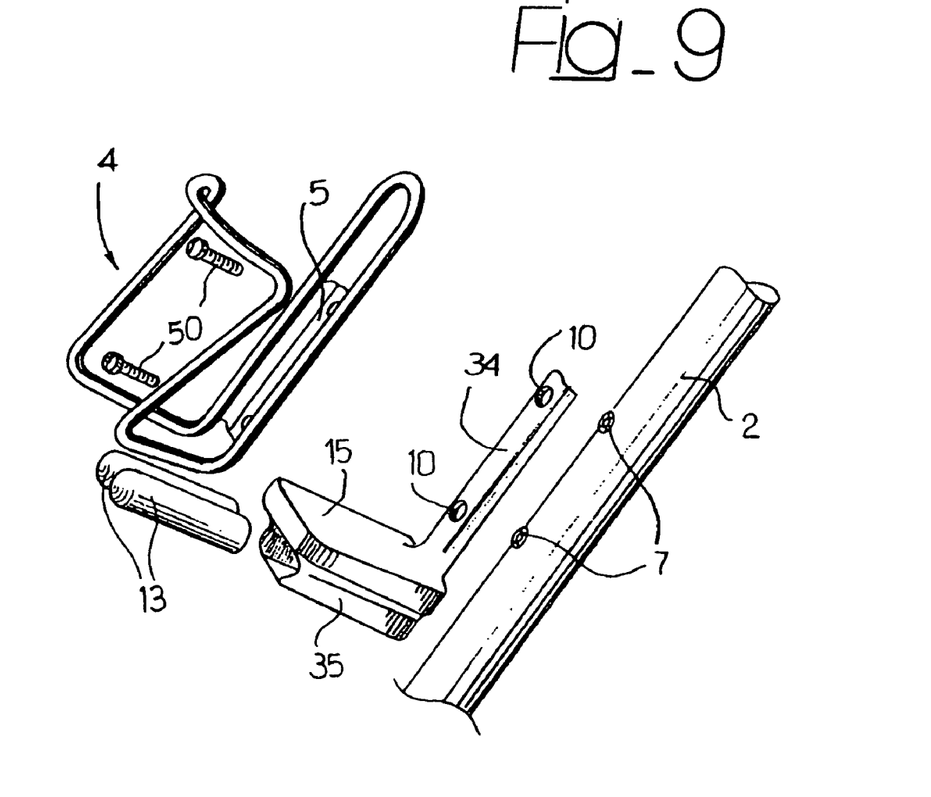

FIGS. 8 and 9 illustrate a further variant of the solution of FIGS. 1-3, in which the two plates 8, 9 are replaced by a single elongated plate 34 which has holes 10 for the fixing screws and is rigidly connected to the container 15 (which has the structure illustrated in FIG. 3). In this case, however, the clamps 11 are not provided, and the batteries 13 are housed in an auxiliary container 35 made beneath the main container 15.

The containment unit is preferably made from a rigid metallic or rigid ceramic material, although other materials may also be used.

Figure 10:
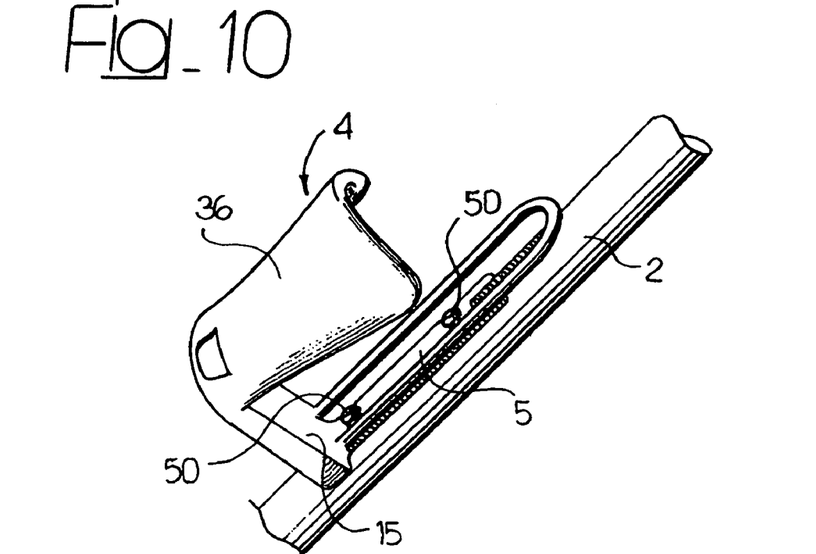
FIGS. 10 and 11 are, respectively, a perspective view and an exploded perspective view of a fifth embodiment of the invention.
Figure 11:
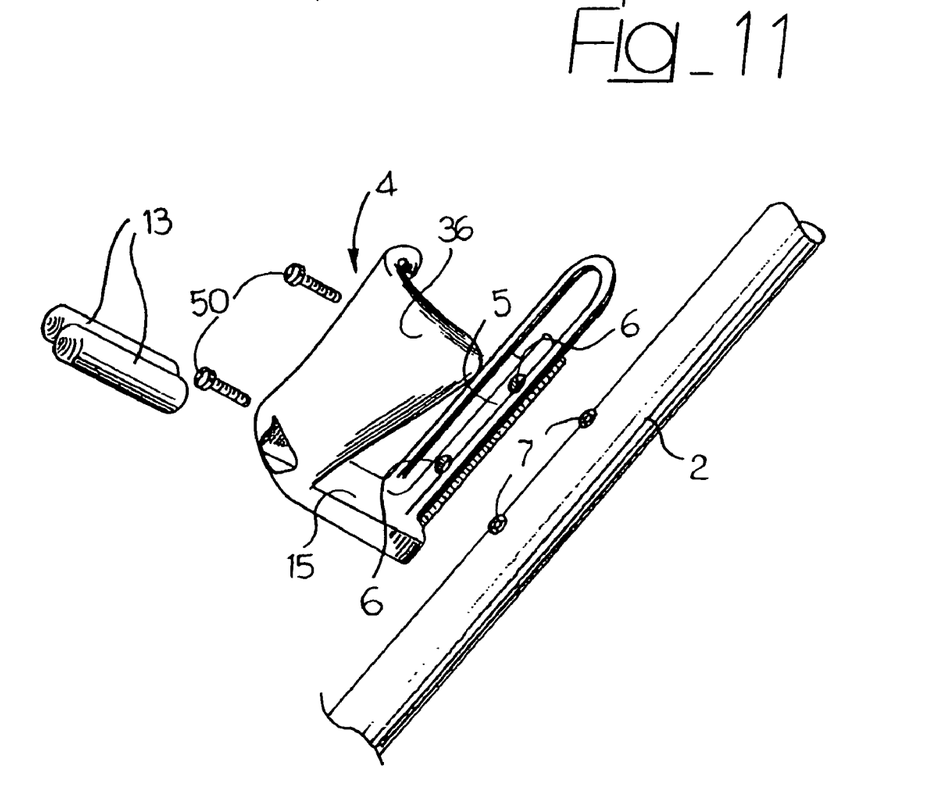

Finally, FIGS. 10 and 11 illustrate a variant of the solution of FIGS. 8 and 9, which differs from the latter only as regards a different conformation of the bottle-cage support 4, which in this case includes a continuous containment wall 36 that is integrated in the body serving as a container for the electronic control unit.

Of course, without prejudice to the principle of the invention, the details of construction and the embodiments may vary widely with respect to what is described and illustrated herein purely by way of example, without thereby departing from the scope of the present invention

What is claimed is:

1. A bottle cage and containment unit comprising:
   a bottle cage that has a support portion with points of attachment for mounting on a bicycle frame, the bottle cage comprising a bottom and a cage that defines a bottle receiving space, wherein the bottom of the bottle cage extends below a bottom of a bottle placed in the bottle receiving space,
   a containment unit having an elongated attachment portion separate from the support portion of the bottle cage and an electronic control unit, the electronic control unit being arranged in a housing defining an internal volume and an upper lid cantilevered and integrally formed as one piece with the elongated attachment portion, separated from the bottom of the bottle cage, and arranged over the housing to enclose the internal volume,
   said internal volume shaped to receive power-generating batteries, said containment unit having an attachment point that aligns with at least one of the attachment points of the bottle cage, wherein the elongated attachment portion of the containment unit separates the support portion of the bottle cage from the bicycle frame when the containment unit and the bottle cage are both mounted to the bicycle frame,
   wherein the containment unit is located outside the bottle receiving space and projects in cantilever fashion beneath the bottle cage bottom.

2. A bottle cage and containment unit comprising:
   a bottle cage that has a support portion with points of attachment for mounting on a bicycle frame, the bottle cage comprising a bottom and a cage that defines a bottle receiving space, wherein the bottom of the bottle cage extends below a bottom of a bottle placed in the bottle receiving space,
   a containment unit having an elongated attachment portion separate from the support portion of the bottle cage and an electronic control unit container having an internal volume cantilevered and integrally formed as one piece with the elongated attachment portion,
   the electronic control unit container being integral with a battery storage container that is shaped to receive power-generating batteries, and shaped substantially the same as the electronic control unit container,
   the containment unit having an attachment point that aligns with at least one of the attachment points of the bottle cage, wherein the elongated attachment portion of the containment unit separates the support portion of the bottle cage from the bicycle frame when the containment unit and the bottle cage are both mounted to the bicycle frame,
   wherein the containment unit is located outside the bottle receiving space separate from the bottom of the bottle cage and projects in cantilever fashion from beneath the bottle cage bottom.

3. A combination bottle cage and electronic component containment unit for mounting on a bicycle frame having an anchoring point for the combination, the combination comprising:
   an electronic component containment unit that includes:
      an elongated support portion adapted for attachment to the anchoring point of the bicycle frame, and an electronic component containment portion having a lid that is integral with and cantilevered from an end of the elongated support portion; and,
   a bottle cage unit that includes:
      an elongated support plate that is separate from the elongated support portion of the containment unit and configured to overlay the elongated support portion of the containment unit and fix the bottle cage unit to the bicycle frame at the anchoring point; and, a bottle cage frame, with opposed vertical portions that are connected by a bottom portion to define a bottle receiving space in which the bottom portion extends below a bottom of a bottle placed in the bottle receiving space, the bottle cage frame being supported by the elongated support plate so that the bottom portion of the bottle cage frame is disposed over and separate from the containment portion lid, wherein the elongated support portion of the electronic component containment unit separates the elongated support plate of the bottle cage unit from the anchoring point of the bicycle frame when the electronic component containment unit and the bottle cage unit are both attached to the anchoring point of the bicycle frame.

4. A bicycle combination bottle cage and battery containment unit comprising:

a bottle cage portion comprising a support, and a bottom, wherein the bottle cage defines a bottle receiving space shaped to secure a bottle whereby the bottom of the bottle cage extends below a bottom of the bottle, an integral control unit and battery storage container located outside the bottle receiving space, said integral control unit and battery storage container projects in cantilever fashion from beneath the bottle cage bottom and is engaged to the bottle cage portion through an auxiliary support of the integral control unit and battery storage container that is separate from the support of the bottle cage portion and has holes aligned with holes of the support of the bottle cage portion, wherein the auxiliary support of the integral control unit and battery storage container separates the support of the bottle cage portion from a bicycle frame when the integral control unit and battery storage container and the bottle cage portion are both attached to the bicycle frame, wherein the integral control unit and battery storage container includes a battery storage volume that is located outside of a separate control unit volume and stores at least one battery and has a connector that transmits electricity stored in the battery to an electronic bicycle component, the control unit volume defined between a housing and a lid that is formed as one piece with the auxiliary support and arranged over the housing, the lid being separate from the bottom of the bottle cage portion.

5. The combination bottle cage and battery containment unit of claim 4 wherein the bottle cage portion comprises an elastically deformable wire.

6. A combination bottle cage and containment unit for mounting on a frame of a bicycle which includes at least one electronic device thereon, the frame having an anchoring point for the combination, the combination comprising;

a bottle cage frame comprising a cage with a bottom that extends below a bottom of a bottle placed in the cage defining a bottle receiving space;

a support member attached to the bottle cage frame and attachable to the anchoring point of the bicycle frame; and a containment unit located outside the bottle receiving space, the containment unit containing an electronic component operatively associated with the at least one electronic device, and having an auxiliary support separate from the support member of the bottle cage frame for attachment to the anchoring point, wherein the auxiliary support of the containment unit separates the support member of the bottle cage frame from the anchoring point when the containment unit and the bottle cage frame are both attached to the anchoring point, wherein the containment unit projects in cantilever fashion from beneath the bottle cage bottom, wherein the containment unit further comprises a container for at least one electronic control card, the container having a housing defining an internal volume and an upper lid separate from the bottom of the cage that is integrally formed as one piece with a bottom end of the auxiliary support and arranged over the housing to enclose the internal volume, and an auxiliary container for a power supply system.

7. The combination bottle cage and containment unit of claim 6, wherein the containment unit extends beneath the bottle cage frame.

8. The combination bottle cage and containment unit according to claim 6, wherein said containment unit is made of a material selected from the group consisting of a plastic material, a rigid metallic material, and a rigid ceramic material.

9. The combination bottle cage and containment unit according to claim 6, wherein said combination is mounted to said anchoring point via aligned holes in said bottle cage support member and said auxiliary support.

10. A containment unit comprising:

a bottle cage comprising a cage with a bottom, that extends below a bottom of a bottle placed in the case, and an engagement portion, the cage defining a bottle receiving space, a support member with an engagement portion separate from and coincidental with the engagement portion of the bottle cage, the engagement portions of the support member and the bottle cage allowing the support member and the bottle cage to engage a bicycle frame independently of each other, wherein the engagement portion of the support member separates the engagement portion of the bottle cage from the bicycle frame when the support member and the bottle cage are both engaged with the bicycle frame.

a housing defining an internal volume that is located outside the bottle receiving space and projects in cantilever fashion from beneath the bottle cage bottom, an upper lid separate from the bottom of the cage that is integrally formed as one piece with a bottom end of the support member and arranged over the housing to enclose the internal volume, and electrical components disposed within the internal volume that operatively engage an electronic device.

11. The containment unit according to claim 10, wherein the electrical components comprise at least one electronic control card.

12. The containment unit according to claim 10, wherein said containment unit is made of a material selected from the group consisting of a plastic material, a rigid metallic material, and a rigid ceramic material.

13. The containment unit according to claim 10, wherein the electrical components comprise a power supply system.

14. The containment unit according to claim 13, further comprising a container for an electric power supply for said power supply system.

15. The containment unit according to claim 10, wherein the electrical components comprise at least one electronic control card and a power supply system.

16. The containment unit according to claim 15, further comprising a container comprising an electric power supply for said power supply system.

17. A bicycle, comprising:
- a frame, which includes at least one electronic device thereon, the frame having an anchoring point, and
- a bottle cage comprising a cage with a bottom that extends below a bottom of a bottle placed in the cage defining a bottle receiving space, the cage having a support member for attachment to the anchoring point of the frame,
- a containment unit located outside the bottle receiving space and fixed to the frame by a containment unit support member at the same anchoring point as the bottle cage support member, the containment unit support member being separate from the bottle cage support member, the containment unit containing a component operatively associated with the at least one electronic device, wherein the containment unit support member separates the bottle cage support member from the frame when the containment unit and the bottle cage are both fixed to the frame,
- wherein the containment unit includes a housing defining an internal volume that is connected to the support member and projects in cantilever fashion from beneath the bottle cage bottom, the housing having an upper portion that is integrally formed as one piece with the containment unit support member and separated from the bottom of the cage,
- wherein the containment unit further comprises a container comprising an electric power supply for a power supply system.

18. The bicycle according to claim 17, wherein said containment unit is made of a material selected from the group consisting of a plastic material, a rigid metallic material, and a rigid ceramic material.

19. The bicycle according to claim 17, wherein the bottle cage support member and the containment unit support member are mounted, via aligned holes therein, to said anchoring point.

20. The bicycle according to claim 17, wherein said anchoring point is located approximately midway between two ends of a down tube of the bicycle frame and said containment unit and said bottle cage are mounted to said anchoring point.

21. The bicycle according to claim 17, wherein said anchoring point is located on a down tube of the bicycle frame.

22. The bicycle according to claim 21, wherein said bottle cage is mounted to said anchoring point and wherein said down tube further comprises an additional anchoring point on which the containment unit is mounted.

\* \* \* \* \*